Sept. 3, 1929.   S. W. ALDERFER   1,727,090
APPARATUS FOR THE MANUFACTURE OF TIRE BEADS
Original Filed Oct. 20, 1926   2 Sheets-Sheet 2

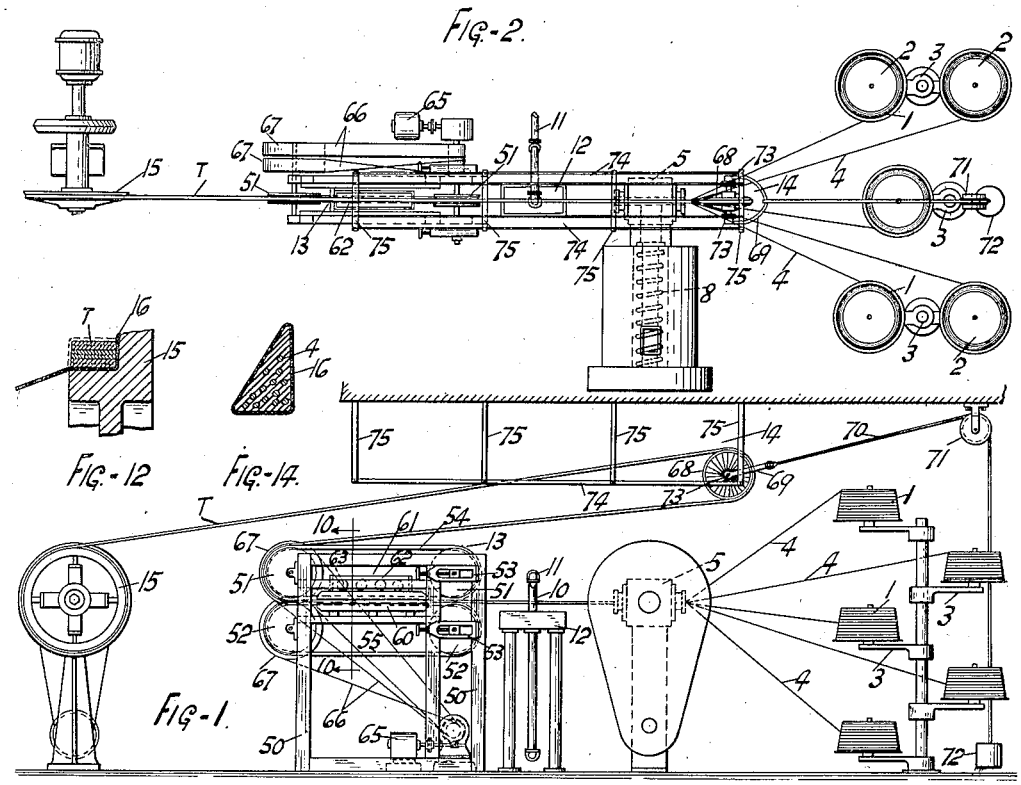

Inventor
STERLING W. ALDERFER
By Ely & Barrow
Attorneys.

Patented Sept. 3, 1929.

1,727,090

UNITED STATES PATENT OFFICE.

STERLING W. ALDERFER, OF AKRON, OHIO, ASSIGNOR TO NATIONAL STANDARD COMPANY, OF NILES, MICHIGAN, A CORPORATION OF MICHIGAN.

APPARATUS FOR THE MANUFACTURE OF TIRE BEADS.

Original application filed October 20, 1926, Serial No. 142,948, now Patent No. 1,633,620, dated June 28, 1927. Divided and this application filed February 23, 1927. Serial No. 170,106.

This invention relates to a new and improved apparatus for use in the manufacture of beads for use in pneumatic tire structures or for the manufacture of bead reenforcements. Objects of the invention are to improve upon the methods of manufacture and reduce the cost.

In the tire bead of the usual or standard form for pneumatic tires of the straight-side or inextensible bead type, a metallic reenforcement is incorporated in the beads of the tire. This reenforcement is usually in the form of a flat tape made of a plurality of small wires which are held together in tape form by braiding or by the use of a light filler wire woven back and forth across the wires. The tape formed by either method is given a coating of rubber which is for the purpose of surrounding and embedding the wires in a mass of rubber which, when the bead is constructed by any of the usual methods, is covered and given a preliminary vulcanization to mold and set it in the form of a tire bead, or the bead may be incorporated directly in the carcass without preliminary vulcanization, or in the green state.

It has been thought essential heretofore to form the wires into a tape by either of the methods described as an operation preliminary to the application of the rubber coating. These tape forming operations add very considerably to the cost of manufacture of the tire, employing expensive machinery and operators.

The purpose of the present invention is to eliminate the weaving or braiding operations by taking the unconnected wires directly from reels or coils and passing them through a die in which the wires are brought closely together in a bunch or tape-like structure, and coated and surrounded with a mass of tenacious rubber composition which maintains the wires in their close relationship in substantially the tape-like form. From the machine the tape may be led directly to the bead building ring upon which it is wound the required number of times to form the tire bead which is covered and given a preliminary cure in the manner as carried out heretofore, although it is possible to carry on the actual building of the bead as a separate operation.

The perfection of the present machine effects the saving to the tire manufacturers of vast sums which are paid for the weaving or braiding operations.

The tape obtained in the manner described is as efficient and strong as prior forms of tape and, in addition, is more flexible than tapes of former constructions and can be more easily shaped and molded to the usual triangular cross-section in which the beads are formed. It also is more adaptable for the so-called "drum built" tires than prior bead constructions. The process of manufacturing the improved bead is covered in my application Serial No. 142,948, filed October 20, 1926, now Patent No. 1,633,620, of which this application is a division.

In the drawings is shown one form of apparatus which has been found practical for the manufacture of tire beads by the method forming the subject matter of the present application. It will be understood, however, that the drawing and description is merely illustrative of the method and apparatus in which the invention may be embodied or carried out, and changes or modifications thereof will fall within the scope of the invention as set forth in the claims hereto appended.

In the drawings:

Figure 1 is a side elevation of a complete unit for the manufacture of the uncured tire bead;

Figure 2 is a plan view;

Figure 3 is an enlarged view of the die;

Figure 4 is a side view of the nozzle of the die;

Figure 5 is a cross-section on the line 5—5 of Figure 3;

Figure 12 is a cross-section through the bead forming ring;

Figure 13 is a cross-section of a tape; and

Figure 14 is a bead which has been given the usual preliminary shaping and vulcanization.

Figure 6:
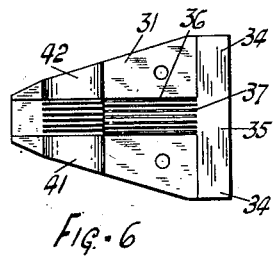
Figure 6 is a face view of a section of the die.

In practising the present invention, the tire manufacturer receives the bare wire, which constitutes the basis of the bead, in coils or rolls, a plurality of which, indicated at 1, are mounted upon swifts or reels, indicated at 2, carried upon supports 3, suitable braking mechanism (not shown) being provided to prevent the reels or swifts from overrunning.

The individual wires 4 are led from their separate sources, through a die head, indicated at 5. At the die the wires are encased and surrounded with a mass of rubber 7, the wires and the rubber issuing from the die in the form of a rubber tape or ribbon T in which the wires are firmly embedded.

The die is heated to enable the rubber to be forced about the wires by a screw feed 8, so that the rubber is warm and plastic. In order to chill the rubber and cause it to harden immediately so that it will regain its original tenacity and may be subsequently treated, it is cooled immediately upon leaving the die, preferably by subjecting it to a spray of water 10 which flows from a pipe 11 and discharges into a suitable drainage receptacle 12.

The rubber surrounding the numerous wires, while preliminarily cooled by the spray, is still somewhat warm and plastic and the tape may be distorted by the tension upon the wires if it is bent at this time. It is, therefore, desirable that the tape T be not bent or otherwise distorted, causing movement or shifting of the wires. The device for drawing the wires through the die, which is indicated generally at 13, is preferably of the type shown and is so constructed that the tape is maintained in flat condition and held under a certain degree of compression until it has become partially set. A full description of the device will be given in a later portion of the specification, it being sufficient to state here merely that the object to be obtained is to hold the tape in flat condition while it is under tension from the drawing mechanism.

From the drawing device 13, the tape passes over a compensator or takeup 14 which is preferably of the horizontal type to reduce the action of the wires and on to the rotating bead forming ring 15 which is controlled by the operator so that a sufficient number of turns of the tape are laid up upon the ring, here shown as three layers, although that number may be changed. The tape is cut off, the end being prevented, by any suitable means, from being pulled back by the compensator. The layers of rubber tape are laid up over a covering fabric 16 which is wrapped about the bead, as shown in dotted lines in Figure 12. When the bead is partially cured, the whole structure is changed to the usual triangular section, shown in Figure 14, the wire shifting to accommodate the new cross-section. The rubber tape manufactured in accordance with this invention lends itself to the latter operation more easily than the woven or braided wire tape formerly used, as it is more flexible due to the fact that the wires are not connected together but simply held in the casing of rubber which will become fluid in vulcanization, permitting the rearrangement of the wires.

Figure 7:
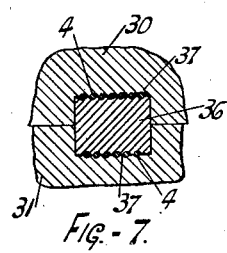
Figure 7 is an enlarged section through the entrance to the die.
Figure 10:
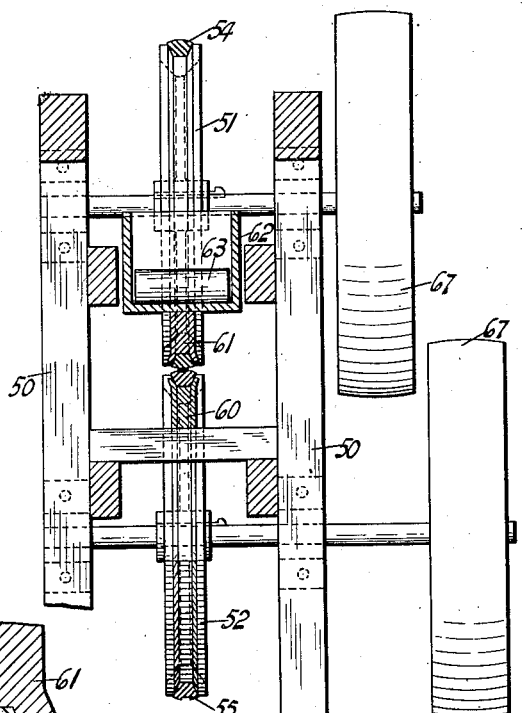
Figure 10 is an enlarged cross-section of the compressing and drawing device which draws the tape through the die and compresses it while the tape is cooling and obtaining its set, the section being taken on the line 10—10 of Figure 1.
Figure 8:
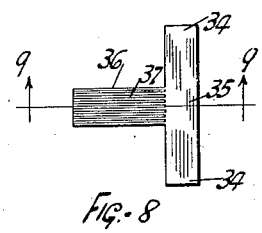
Figures 8 and 9 are a plan and a section, respectively, of the separator or spreader, the latter being on the line 9—9 of Figure 8.
Figure 9:
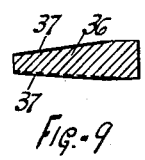
Figure 11:
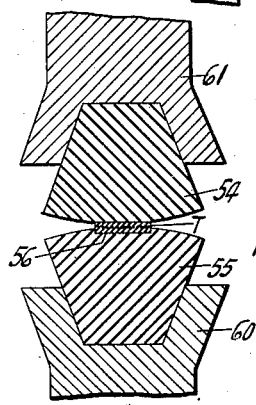
Figure 11 is an enlarged detail of the tape within the drawing device.

Difficulty may be encountered in causing the numerous wires which constitute the bead reenforcement to be held together solely by the mass of tenacious rubber which surrounds the wire unless the rubber is thoroughly forced into the interstices in the mass of wires, and for the purpose of accomplishing this result in a satisfactory manner, the form of die shown in details in Figures 3 to 9 is employed.

The wires are led from their separate sources and are divided into a plurality of groups, here shown as two groups, which are separated and spaced apart and a portion of the rubber is forced into and between the groups of wires while they are so spaced. The subsequent drawing together of the wires and additional encasement with rubber causes a very thorough penetration of rubber into and about the wires.

In the apparatus as shown in Figure 3, the numerals 20 and 21 represent, respectively, the two walls of the die head. In the wall 20 is received a screw-threaded die casing 22, the inner portion of which is provided with a tapered or conical seat 23, in which is received the first die or nozzle 24 through which the several wires are passed. This die is retained in its seat by a threaded plug 25 screwed into the casing 22.

The die or nozzle 24 is formed of two sections or halves 30 and 31, which together form a substantially cone-shaped nozzle separated along a central plane. The two sections are held together in the conical seat 23 by the plug 25 and are properly positioned by means of dowels 32. The rear face of the sections 30 and 31 are formed with mating notches 33, in which are seated the lateral arms 34 of a T-shaped spreader 35, the shank 36 of which lies between the die sections and extends toward the mouth thereof. The groups of wires referred to pass on either side of the spreader, and the opposed faces of the sections or the spreader, or both, are formed with grooves 37 which serve as guides for the wires.

The spreader terminates short of the die opening, as shown in Figure 3, to afford a chamber between the groups of wires, which chamber is constantly filled with rubber from the main body of rubber within the die head under pressure from the feed screw, the rubber entering the chamber through a passageway 41 at the side of the nozzle closest to the feed screw and passing out through a more restricted opening 42 at the opposite side of the die. The two groups of wires completely embedded in the rubber which has been thus forced between them, pass out of the nozzle or die 24 through its restricted mouth 44.

The feature which has just been described, i. e., the forcing of rubber between the spaced groups of wires and the subsequent bringing together or compacting of the wires into the rubber, while not essential, nevertheless is an important one to the present invention, for by this means a thorough and complete embedding of the wires in the rubber is obtained, which is desirable in order to grip and hold the wires in the tape form without any other holding agent than the mass of rubber.

The mouth 44 of the nozzle 24 is somewhat smaller than the finished tape. It is placed close to the opposite wall 21 and is in register with a second die 45 spaced about the nozzle so that an additional mass or jacket of rubber is forced about the wires, the completed tape issuing in the form shown in Figure 13 through the reduced opening 46 in the die 45. The die 45 is seated in a die casing 48 screwed into the wall 21 and is held in place by a screw-threaded plug 49.

It is necessary to draw the tape through the die. In former practices this was usually done by passing the tape about driven rolls. It was found, however, that such practice was not so desirable in the present process for the reason that the bending of the tape about the rolls caused the wires to shift and separate. For this reason the tape is drawn out in flat condition and maintained in such condition as long as practicable or until the hot plastic rubber has obtained at least a partial set and the tension relieved.

After the tape passes through the spray 10 it goes into the drawing and compressing device 13. This comprises a framework 50 in which are mounted pairs of horizontally arranged pulleys 51 and 52, one pulley of each pair being provided with the usual belt tightening device 53. Over the pulleys are trained belts 54 and 55, the lower and upper runs of which are parallel and closely positioned with respect to one another. One of the belts, here shown as the belt 55, is provided with a shallow groove 56 in which the tape T is received, the groove being somewhat shallower than the thickness of the tape. The lower belt is supported and guided in a grooved horizontal runway 60, while the upper belt is guided in a horizontal bearing plate 61, each of which extends along the length of the belts between the pulleys. The bearing plate 61 is pressed downwardly with sufficient yielding pressure to securely grip the tape and incidentally to compress it while it is being drawn through the machine. A trough 62 rests for this purpose on top of the bearing plate, being loaded with any suitable quantity of weights 63 to secure the desired result. The belts are driven in the same direction by means of a motor 65 and straight and crossed belts 66 running over pulleys 67 mounted upon the pulley shafts.

As the drawing machine and the die are continuously operated and the bead ring is intermittently operated, preferably at a higher speed than the drawing machine, it is advisable to interpose a compensator or storage device between these two elements. Such a compensator is shown at 14, being preferably of a horizontal type so as to avoid as much as possible bending of the tape. The compensator is preferably arranged above the apparatus and comprises a floating pulley or wheel 68, to which is attached, by a fork 69, a cable 70. The cable passes over a pulley 71 and supports a counterweight 72. The pulley is supported upon rollers 73 which run over tracks 74 suspended from the ceiling by hangers 75. As the tape is withdrawn by the rotating bead drum, the pulley 68 moves forwardly over the tracks, and as the supply of tape is replenished from the element 13, the pulley will recede. In this manner a supply of tape is kept in the machine at all times.

The operation and advantages of the invention will be understood by those skilled in this art. The changes and modifications which may be suggested to those skilled in this art will not depart from the scope of the invention.

What is claimed is:

1. In an apparatus for the uses and purposes set forth, the combination with a plurality of supplies for individual wires, a die head and a die therein, means for guiding the wires into groups into the die and maintaining the groups spaced apart as they enter the die, means for forcing rubber into the wires while spaced apart, and a second die in alignment with the first and adapted to encase the wires as they issue from the first said die in a jacket of rubber.

2. In an apparatus for the uses and purposes set forth, the combination with a plurality of supplies for individual wires, a die head and a die therein, means for guiding the wires in groups into the die and maintaining the groups spaced apart as they enter the die, means for forcing rubber into the wires while spaced apart, the die forcing the wires into intimate relation, and a second die in alignment with the first and adapted to encase the wires as they issue from the first said die in a jacket of rubber.

3. In an apparatus for the uses and purposes set forth, the combination with a plurality of supplies for individual wires, a die head and a die therein, means for guiding the wires in groups into the die and maintaining the groups spaced apart as they enter the die, means for forcing rubber into the wires while spaced apart, a second die in alignment with first and adapted to encase the wires as they issue from the first said die in a jacket of rubber, and a bead forming ring upon which the tape is wound to form a tire bead.

4. In an apparatus for the uses and purposes set forth, the combination with a plurality of supplies for individual wires, a die head and a die therein, means for guiding the wires in groups into the die and maintaining the groups spaced apart as they enter the die, means for forcing rubber into the wires while spaced apart, the die forcing the wires into intimate relation, a second die in alignment with the first and adapted to encase the wires as they issue from the first said die in a jacket of rubber, and a bead forming ring upon which the tape is wound to form a tire bead.

5. An apparatus for manufacturing tire beads, comprising a die, a plurality of sources of individual wires at one side of the die and a bead forming ring at the other side of the die, means for forcing rubber through the die and about the wires to maintain them in intimate relation and in the form of a tape, the tape passing directly to the bead forming ring.

6. An apparatus for manufacturing tire beads, comprising a die having a restricted outlet, a plurality of sources of individual wires at the entrance to the die and a rotating bead forming ring at its outlet, means to force the rubber into and about said wires whereby a rubber tape having wires embedded therein issues from the die, and means to draw the tape from the die and deliver it to the bead forming ring.

7. An apparatus for manufacturing tire beads, comprising a die, a plurality of sources of individual wires at the entrance to the die, the die having a restricted passage which crowds the wires together, means to force the rubber between and about said wires whereby a rubber tape having wires embedded therein issues from the die, means to chill the tape, and means to draw the tape from the die and compress it.

8. An apparatus for manufacturing tire beads, comprising a die, a plurality of sources of individual wires at the entrance to the die, means to space the wires into groups, means to force rubber between the groups of wires, the die having a restricted passage to subsequently bring the wires into close relation, and means for drawing the rubber tape with the wires embedded therein from the die.

9. An apparatus for manufacturing tire beads, comprising a die, a plurality of sources of individual wires at the entrance to the die, means to space the wires into groups, means to force rubber between the groups of wires, the die having a restricted passage to subsequently bring the wires into close relation, and means for drawing the tape with the wires embedded therein from the die and compacting the tape.

10. An apparatus for manufacturing tire beads, comprising a heated die, a plurality of sources of individual wires at the entrance to the die, means to space the wires apart, means to force rubber between the wires, the die having a restricted passage which serves to subsequently bring the wires into close relation to form a strip, means for drawing the strip from the die without distorting and compacting and means for chilling the strip.

11. An apparatus for forming a bead reenforcement, comprising a plurality of sources of individual wires, a separator to divide the wires into groups, a chamber into which the groups of wires are led, means to force heated rubber into the chamber and between the groups of wires, a die through which the wires pass from the chamber and by which the wires and the rubber are reduced to a tape, means for chilling the tape as it issues from the die, and means to conduct the tape for a substantial distance from the die without distortion.

12. An apparatus for forming a bead reenforcement, comprising a plurality of sources of individual wires, a separator to divide the wires into groups, a chamber into which the groups of wires are led, means to force heated rubber into the chamber and between the groups of wires, a die through which the wires pass from the chamber and by which the wires and the rubber are reduced to a tape, and means to conduct the tape for a considerable distance from the die without distorting.

13. An apparatus for forming a bead reenforcement, comprising a plurality of sources of individual wires, a separator to divide the wires into groups, a chamber into which the groups of wires are led, means to force heated rubber into the chamber and between the groups of wires, a die through which the wires pass from the chamber and by which the wires and the rubber are reduced to a tape, a second die for encasing the tape in an outer jacket of rubber, and means to conduct the tape for a considerable distance from the die without distortion.

14. An apparatus for forming a bead reenforcement, comprising a plurality of sources of individual wires, a separator to divide the wires into groups, a chamber into which the groups of wires are led, means to force heated rubber into the chamber and between the groups of wires, a die through which the wires pass from the chamber and by which the wires and the rubber are reduced to a tape, means to chill the tape, and means to conduct the tape for a considerable distance from the die without distorting.

15. An apparatus for forming a bead reenforcement, comprising a plurality of sources of individual wires, a separator to divide the wires into groups, a chamber into which the groups of wires are led, means to force heated rubber into the chamber and between the groups of wires, a die through which the wires pass from the chamber and by which the wires and the rubber are reduced to a tape, means for chilling the tape as it issues from the die, means to conduct the tape for a substantial distance from the die without distorting, and a rotating bead forming ring receiving the tape directly from the die.

16. An apparatus for forming a bead reenforcement, comprising a plurality of sources of individual wires, a separator to divide the wires into groups, a chamber into which the groups of wires are led, means to force heated rubber into the chamber and between the groups of wires, a die through which the wires pass from the chamber and by which the wires and the rubber are reduced to a tape, means for chilling the tape as it issues from the die, means to conduct the tape for a substantial distance from the die without distorting, a rotating bead forming ring receiving the tape directly from the die, and a storage supply anterior to the ring.

17. In an apparatus for manufacturing tire beads, a heated die having a tapering passageway, an elongated narrow opening at the apex of the passageway, a plurality of sources of individual wires at the entrance to the die, means to force rubber into the tapering passageway, and means to draw the wires through the passageway and through the opening so that the wires which are crowded together into parallel relationship issue from the die with a mass of rubber, by which they are spaced apart but held together in fixed position relative to one another.

STERLING W. ALDERFER.